(12) United States Patent
Horiguchi

(10) Patent No.: US 10,070,007 B2
(45) Date of Patent: Sep. 4, 2018

(54) IMAGE READING DEVICE CAPABLE OF READING IMAGE DATA FROM DOCUMENT SHEET AND ADJUSTING SHADING CORRECTION

(71) Applicant: KYOCERA Document Solutions Inc., Osaka-shi, Osaka (JP)

(72) Inventor: Yasuyuki Horiguchi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/615,392

(22) Filed: Jun. 6, 2017

(65) Prior Publication Data

US 2017/0359484 A1 Dec. 14, 2017

(30) Foreign Application Priority Data

Jun. 8, 2016 (JP) ................. 2016-114024

(51) Int. Cl.
*H04N 1/04* (2006.01)
*H04N 1/401* (2006.01)
(Continued)

(52) U.S. Cl.
CPC ............... *H04N 1/401* (2013.01); *H04N 1/04* (2013.01); *H04N 1/12* (2013.01); *H04N 1/409* (2013.01); *H04N 2201/0081* (2013.01)

(58) Field of Classification Search
CPC ........... H04N 1/00931; H04N 1/00976; H04N 1/0405; H04N 1/0473; H04N 1/1056; H04N 1/123; H04N 1/125; H04N 1/128; H04N 1/2307; H04N 1/233; H04N 1/32358; H04N 1/32496; H04N 1/405; H04N 1/409; H04N 1/52; H04N 1/622; H04N 2201/0081; H04N 2201/02439; H04N 2201/042;
(Continued)

(56) References Cited

U.S. PATENT DOCUMENTS 7,072,082 B2 * 7/2006 Yokota ................. H04N 1/0464
250/208.1
7,436,557 B2 * 10/2008 Suzuki ..................... H04N 1/04
358/471
(Continued)

FOREIGN PATENT DOCUMENTS

JP 2002044438 A 2/2002

*Primary Examiner* — Negussie Worku
(74) *Attorney, Agent, or Firm* — Alleman Hall Creasman & Tuttle LLP

(57) ABSTRACT

An image reading device includes a first setting processing portion, a second setting processing portion, and a third setting processing portion. The first setting processing portion, when first reference data has been read in a first reading process in which image data is read from a sheet placed on a sheet placement portion, sets a first adjustment value which is used in a shading correction. The second setting processing portion, when second reference data has been read in a second reading process in which image data is read from a sheet conveyed by a sheet conveying portion, sets a second adjustment value which is used in the shading correction. The third setting processing portion, in a case where only one of the first adjustment value and the second adjustment value has been set, sets the other based on the one that has been set.

6 Claims, 6 Drawing Sheets

(51) Int. Cl.
*H04N 1/12* (2006.01)
*H04N 1/409* (2006.01)

(58) Field of Classification Search
CPC . H04N 2201/04703; H04N 2201/0471; H04N 2201/04725; H04N 2201/04732; H04N 2201/04734; H04N 2201/04737; H04N 2201/04739; H04N 2201/04755
USPC ...... 358/474, 461, 497, 486, 1.15, 475, 518, 358/1.13, 406, 448, 487, 505, 514, 1.9, 358/509, 520, 530, 1.1, 2.1, 443, 453, 358/471, 506, 537, 1.14, 1.18, 1.2, 296, 358/3.21, 3.26, 446, 449, 450, 451, 462, 358/464, 466, 488, 494, 496, 512, 515, 358/521, 534; 709/203, 220, 223, 225; 399/32, 79, 8, 211, 221, 366, 367, 371, 399/379, 380, 381, 92, 94
See application file for complete search history.

(56) References Cited

U.S. PATENT DOCUMENTS

| | | | | |
|---|---|---|---|---|
| 7,529,003 B2* | 5/2009 | Fukawa | ................ | H04N 1/484 358/505 |
| 7,548,341 B2* | 6/2009 | Gotoh | ................ | H04N 1/6086 358/1.9 |
| 7,567,360 B2* | 7/2009 | Takahashi | ............ | G06F 3/1205 358/1.15 |
| 7,580,161 B2* | 8/2009 | Shoda | ................ | H04N 1/3871 356/71 |
| 7,715,066 B2* | 5/2010 | Michiie | ............ | H04N 1/00689 250/208.1 |
| 8,203,771 B2* | 6/2012 | Suzuki | ................ | H04N 1/6027 358/1.13 |
| 8,368,942 B2* | 2/2013 | Hattori | ................ | H04N 1/3872 345/619 |
| 8,384,967 B2* | 2/2013 | Shinkawa | .......... | H04N 1/00002 358/474 |
| 9,609,231 B2* | 3/2017 | Ikefuji | ............. | H04N 5/2355 |
| 2004/0246512 A1* | 12/2004 | Miyamoto | ................ | B41J 2/04 358/1.13 |
| 2004/0246533 A1* | 12/2004 | Touura | ............... | H04N 1/40062 358/461 |
| 2009/0086229 A1* | 4/2009 | Hyuga | ................ | H04N 1/4051 358/1.9 |
| 2009/0316169 A1* | 12/2009 | Katsunoi | ........... | H04N 1/00912 358/1.9 |
| 2015/0370543 A1* | 12/2015 | Masuda | .................... | G06F 8/38 717/106 |

* cited by examiner

US 10,070,007 B2

IMAGE READING DEVICE CAPABLE OF READING IMAGE DATA FROM DOCUMENT SHEET AND ADJUSTING SHADING CORRECTION

INCORPORATION BY REFERENCE

This application is based upon and claims the benefit of priority from the corresponding Japanese Patent Application No. 2016-114024 filed on Jun. 8, 2016, the entire contents of which are incorporated herein by reference.

BACKGROUND

The present disclosure relates to an image reading device capable of reading image data from a document sheet, an image forming apparatus including an image reading device, and an adjustment value setting method implemented in an image reading device.

An image reading device mounted on a copier or the like may include a contact glass and an ADF (Auto Document Feeder), wherein a document sheet is placed on the contact glass, and the ADF conveys the document sheet. In this type of image reading device, two different reading methods are provided to read image data from the document sheet. Specifically, this type of image reading device can read image data from a document sheet placed on the contact glass. In addition, this type of image reading device can read image data from a document sheet when it is being conveyed by the ADF so as to pass a reading position on the contact glass.

Meanwhile, in this type of image reading device, a difference in density may occur between the image data read from the document sheet placed on the contact glass and the image data read from the document sheet conveyed by the ADF. For example, in the image reading device, in a case where image data is read from the document sheet placed on the contact glass, the document sheet is pressed against the contact glass by a cover member to be in close contact with the contact glass. On the other hand, in a case where image data is read from the document sheet conveyed by the ADF, the document sheet may be conveyed in a state of being separated from the contact glass at the reading position. In this case, a difference in the distance from the contact glass to the document sheet is generated between the case where image data is read from the document sheet placed on the contact glass, and the case where image data is read from the document sheet conveyed by the ADF. Due to the difference in the distance, the image data read from the document sheet conveyed by the ADF is denser (darker) than the image data read from the document sheet placed on the contact glass.

With regard to the above-described problem, there is known a conventional technology that can reduce the difference in image data density that occurs due to a difference between reading methods, by performing a shading correction using adjustment values that are obtained respectively for the reading methods in advance. Specifically, according to the conventional technology, an adjustment value is obtained for each of a plurality of reading methods based on image data read from a predetermined reference density document sheet by each reading method.

SUMMARY

An image reading device according to an aspect of the present disclosure includes an image reading portion, a storage portion, a sheet placement portion, a first reading processing portion, a first correction processing portion, a first setting processing portion, a sheet conveying portion, a second reading processing portion, a second correction processing portion, a second setting processing portion, and a third setting processing portion. The image reading portion reads image data from a sheet. The storage portion stores a predetermined first adjustment value and a predetermined second adjustment value. On the sheet placement portion, the sheet is placed. The first reading processing portion executes a first reading process in which to, by using the image reading portion, read image data from the sheet placed on the sheet placement portion. The first correction processing portion executes a shading correction using the first adjustment value, on the image data read in the first reading process. The first setting processing portion, when first reference data corresponding to a predetermined reference image has been read in the first reading process from a reference sheet including the reference image, obtains a first identification value corresponding to the first reference data, based on the first reference data, and sets the first adjustment value based on the first identification value. The sheet conveying portion conveys the sheet. The second reading processing portion executes a second reading process in which to, by using the image reading portion, read image data from the sheet conveyed by the sheet conveying portion. The second correction processing portion executes the shading correction using the second adjustment value, on the image data read in the second reading process. The second setting processing portion, when second reference data corresponding to the reference image has been read from the reference sheet in the second reading process, obtains a second identification value corresponding to the second reference data, based on the second reference data, and sets the second adjustment value based on the second identification value. The third setting processing portion sets the second adjustment value based on the first adjustment value in a case where the second adjustment value has not been set by the second setting processing portion and the first adjustment value has been set by the first setting processing portion, and sets the first adjustment value based on the second adjustment value in a case where the first adjustment value has not been set by the first setting processing portion and the second adjustment value has been set by the second setting processing portion.

An image forming apparatus according to another aspect of the present disclosure includes the image reading device and an image forming portion. The image forming portion is configured to form an image based on image data read by the image reading device.

An adjustment value setting method according to a further aspect of the present disclosure is implemented in an image reading device including an image reading portion configured to read image data from a sheet, a storage portion configured to store a predetermined first adjustment value and a predetermined second adjustment value, a sheet placement portion on which the sheet is placed, and a sheet conveying portion configured to convey the sheet, and includes a first step, a second step, a third step, a fourth step, a fifth step, a sixth step, and a seventh step. In the first step, a first reading process is executed in which image data is read, by using the image reading portion, from the sheet placed on the sheet placement portion. In the second step, a shading correction using the first adjustment value is executed on the image data read in the first reading process. In the third step, when first reference data corresponding to a predetermined reference image has been read in the first reading process from a reference sheet including the reference image, a first identification value corresponding to the first reference data is obtained based on the first reference data, and the first adjustment value is set based on the first identification value. In the fourth step, a second reading process is executed in which image data is read, by using the image reading portion, from the sheet conveyed by the sheet conveying portion. In the fifth step, the shading correction using the second adjustment value is executed on the image data read in the second reading process. In the sixth step, when second reference data corresponding to the reference image has been read from the reference sheet in the second reading process, a second identification value corresponding to the second reference data is obtained based on the second reference data, and the second adjustment value is set based on the second identification value. In the seventh step, the second adjustment value is set based on the first adjustment value in a case where the second adjustment value has not been set in the sixth step and the first adjustment value has been set in the third step, and the first adjustment value is set based on the second adjustment value in a case where the first adjustment value has not been set in the third step and the second adjustment value has been set in the sixth step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclusure with reference to the attached drawings for the understanding of the present disclosure. It should be noted that the following embodiment is an example of a specific embodiment of the present disclosure and should not limit the technical scope of the present disclosure.

[Configuration of Image Forming Apparatus 10]

Figure 1:
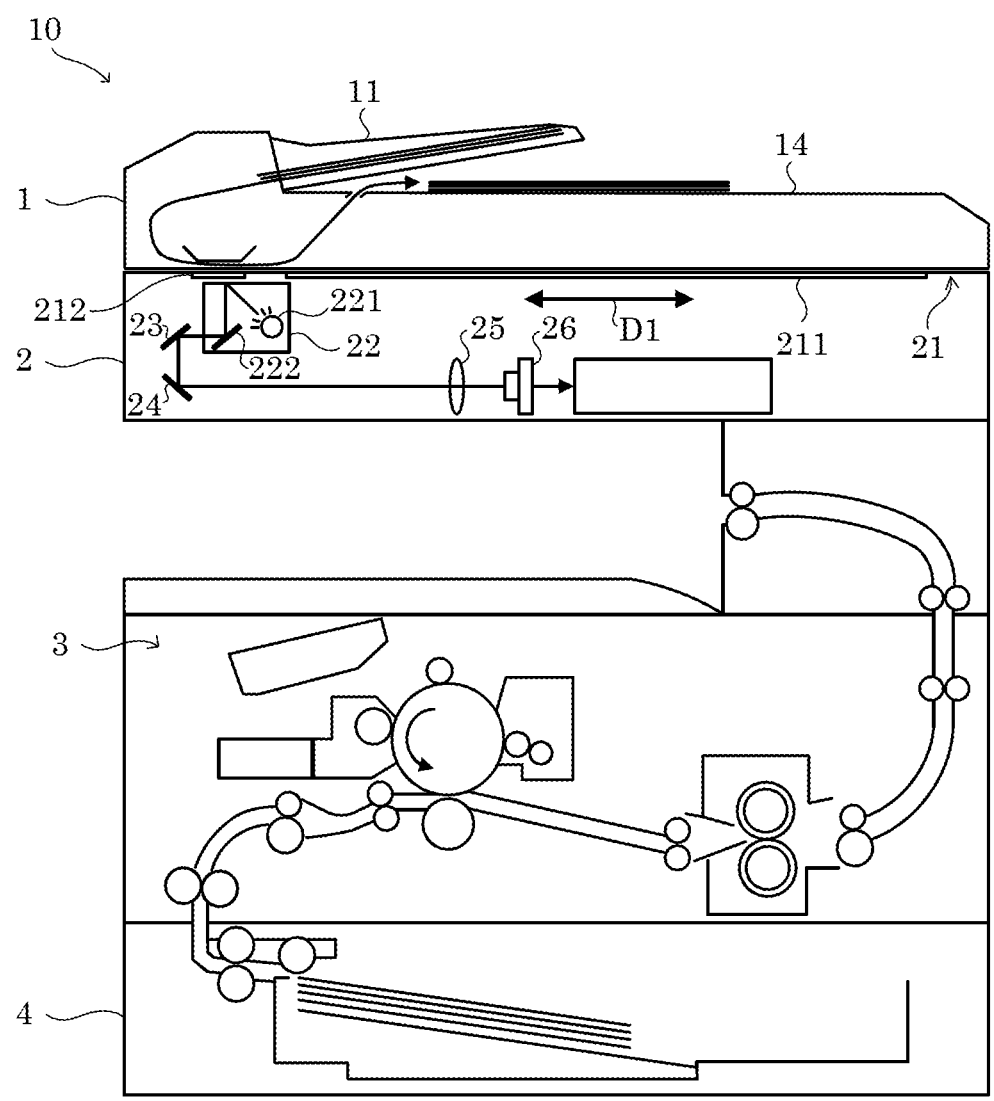
FIG. 1 is a diagram showing a configuration of an image forming apparatus according to an embodiment of the present disclosure.

First, a configuration of an image forming apparatus 10 according to an embodiment of the present disclosure is described with reference to FIG. 1 to FIG. 3. Here, FIG. 1 is a schematic cross-sectional view showing the configuration of the image forming apparatus 10. FIG. 3 is a schematic cross-sectional view showing a part of the configuration of an ADF 1 and an image reading portion 2.

The image forming apparatus 10 is a multifunction peripheral having a plurality of functions such as a scan function for reading image data from a document sheet, a print function for forming an image based on the image data, a facsimile function, and a copy function.

Figure 2:
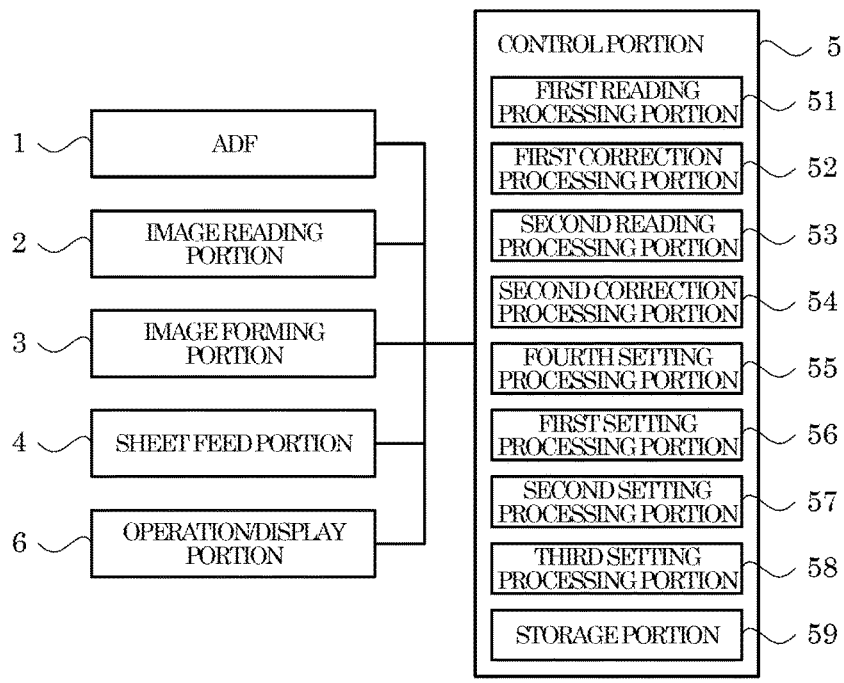
FIG. 2 is a block diagram showing a system configuration of the image forming apparatus according to the embodiment of the present disclosure.
Figure 3:
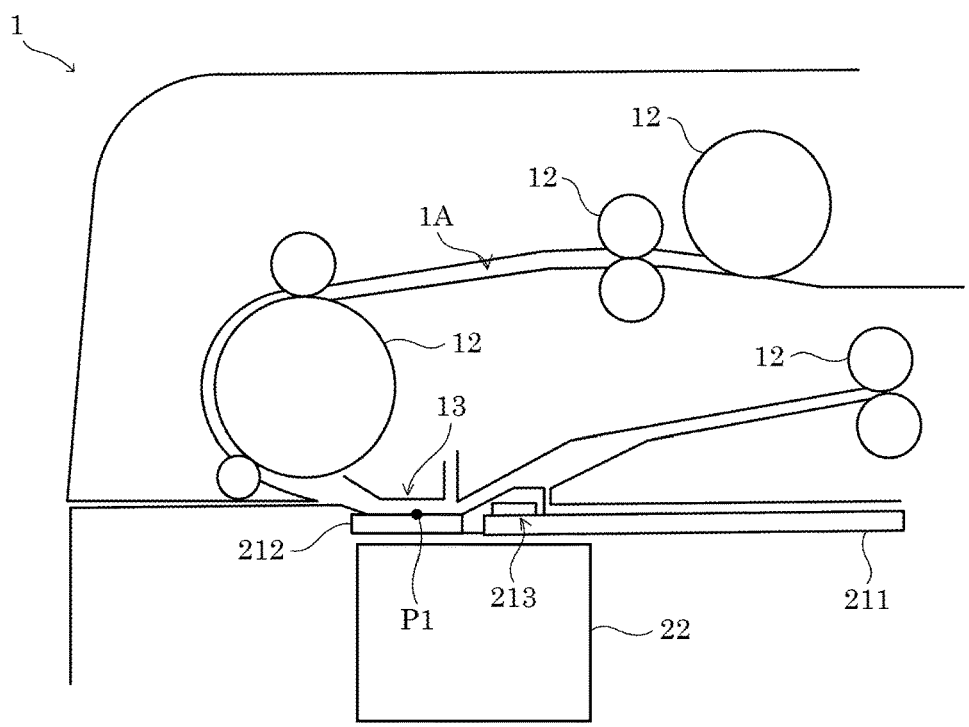
FIG. 3 is a diagram showing a configuration of an ADF and an image reading portion of the image forming apparatus according to the embodiment of the present disclosure.

As shown in FIG. 1 and FIG. 2, the image forming apparatus 10 includes the ADF (Auto Document Feeder) 1, the image reading portion 2, an image forming portion 3, a sheet feed portion 4, a control portion 5, and an operation/display portion 6.

The image forming portion 3 is configured to form an image by an electrophotographic system based on image data. Specifically, the image forming portion 3 includes a photoconductor drum, a charging device, a laser scanning device, a developing device, a transfer device, a cleaning device, a fixing device, and a sheet discharge tray. The sheet feed portion 4 includes a sheet feed cassette, a sheet conveyance path, and a plurality of conveyance rollers, and supplies sheets to the image forming portion 3. The image forming portion 3 forms an image based on image data on a sheet supplied from the sheet feed portion 4. The sheet with the image formed thereon by the image forming portion 3 is discharged to the sheet discharge tray. It is noted that the image forming portion 3 may form an image by another image forming system such as an ink jet system.

The control portion 5 includes control equipment such as CPU, ROM, RAM, and EEPROM that are not shown. The CPU is a processor that executes various calculation processes. The ROM is a nonvolatile storage medium in which various information such as control programs for causing the CPU to execute various processes are stored in advance. The RAM is a volatile storage medium, and the EEPROM is a nonvolatile storage medium. The RAM and the EEPROM are used as temporary storage memory (working area) for the various processes executed by the CPU. In the control portion 5, the CPU executes the various control programs stored in advance in the ROM. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion, wherein the display portion includes a liquid crystal display and displays various types of information in response to control instructions from the control portion 5, and the operation portion is, for example, operation keys or a touch panel that inputs various types of information to the control portion 5 in response to user operations.

The ADF 1 conveys a document sheet so that image data is read from the document sheet by the image reading portion 2. Specifically, as shown in FIG. 1 and FIG. 3, the ADF 1 includes a document sheet conveyance path 1A, a document sheet placement portion 11, a plurality of conveyance rollers 12, a document sheet guide 13, and a sheet discharge portion 14. In addition, the ADF 1 is supported in such a way as to be opened and closed with respect to a document sheet table 21 that is described below, and serves as a document sheet cover for covering a document sheet placed on a first contact glass 211 of the document sheet table 21.

In the ADF 1, the conveyance rollers 12 are driven by a motor (not shown). This allows a document sheet placed on the document sheet placement portion 11 to be fed into and conveyed in the document sheet conveyance path 1A formed inside the ADF 1. The document sheet conveyed in the document sheet conveyance path 1A is guided by the document sheet guide 13 to a reading position P1 on a second contact glass 212 of the document sheet table 21 (see FIG. 3), and then discharged to the sheet discharge portion 14.

The image reading portion 2 is configured to read image data from the document sheet. Specifically, as shown in FIG. 1 and FIG. 3, the image reading portion 2 includes the document sheet table 21, a read unit 22, a mirror 23, a mirror 24, an optical lens 25, and a CCD 26.

The document sheet table 21 is provided on an upper surface of a housing of the image forming apparatus 10. As shown in FIG. 1 and FIG. 3, the document sheet table 21 includes the first contact glass 211, the second contact glass 212, and a white reference plate 213. A document sheet can be placed on the first contact glass 211. The second contact glass 212 is disposed to face the document sheet guide 13 of the ADF 1 when the ADF 1 is in a closed state with respect to the document sheet table 21. As shown in FIG. 3, the white reference plate 213 is provided on an upper surface of the first contact glass 211 at and thereof on the second contact glass 212 side. The white reference plate 213 includes a predetermined first reference image on a surface thereof facing the first contact glass 211. For example, the first reference image is a solid image having a predetermined reference density corresponding to white. Third reference data is read from the white reference plate 213, wherein the third reference data is used in shading correction that is described below.

The image reading portion 2 can read image data from a document sheet by two reading methods. Specifically, the image reading portion 2 can read image data from a document sheet placed on the first contact glass 211. In addition, the image reading portion 2 can read image data from a document sheet that is passing the reading position P1 on the second contact glass 212 while conveyed by the ADF 1. Here, a document sheet placed on the first contact glass 211 or a document sheet placed on the document sheet placement portion 11 of the ADF 1 is an example of the sheet of the present disclosure. In addition, the first contact glass 211 is an example of the sheet placement portion of the present disclosure. In addition, the ADF 1 is an example of the sheet conveying portion of the present disclosure.

The read unit 22 is provided below the document sheet table 21. The read unit 22 is configured to be moved in a sub scanning direction D1 shown in FIG. 1, by a movement mechanism (not shown) that includes a driving portion such as a stepping motor. As shown in FIG. 1, the read unit 22 includes a light source 221 and a mirror 222. The light source 221 is composed of a plurality of white LEDs arranged in alignment along a main scanning direction that is perpendicular to the plane of FIG. 1. The light source 221 emits a line of white light extending in the main scanning direction, toward the document sheet table 21. The light emitted from the light source 221 passes through the first contact glass 211 or the second contact glass 212 and is irradiated on a document sheet placed on the first contact glass 211, or a document sheet conveyed by the ADF 1. The mirror 222 receives light emitted from the light source 221 and reflected from the document sheet, and reflects the light to the mirror 23.

In a case where the image reading portion 2 reads image data from a document sheet placed on the first contact glass 211, the read unit 22 is moved by the movement mechanism to a position below the first contact glass 211. This allows the light emitted from the light source 221 to pass through the first contact glass 211 and be irradiated on the document sheet placed on the first contact glass 211. In addition, the read unit 22 is moved by the movement mechanism in the sub scanning direction D1. This allows the light emitted from the light source 221 and irradiated on the document sheet is scanned in the sub scanning direction D1.

In addition, in a case where the image reading portion 2 reads image data from a document sheet conveyed by the ADF 1, the read unit 22 is moved by the movement mechanism to a position below the second contact glass 212. Specifically, the read unit 22 is moved by the movement mechanism to a position where the light emitted from the light source 221 passes through the reading position P1 (see FIG. 3). This allows the light emitted from the light source 221 to be passed through the second contact glass 212 and the reading position P1 and be irradiated on the document sheet that is being conveyed by the ADF 1.

Furthermore, in a case where the third reference data is read from the white reference plate 213, the read unit 22 is moved to a position below the white reference plate 213. This allows the light emitted from the light source 221 to be passed through the first contact glass 211 and be irradiated on the white reference plate 213 provided on the first contact glass 211.

The mirror 23 receives light reflected from the mirror 222 of the read unit 22, and reflects the light to the mirror 24. The mirror 24 receives the light reflected from the mirror 23, and reflects the light to the optical lens 25. The optical lens 25 collects the light reflected from the mirror 24, and causes the collected light to enter the CCD 26.

The CCD 26 is an image sensor having a plurality of photoelectric conversion elements that are arranged along the main scanning direction. The CCD 26 outputs an electric signal corresponding to an amount of received light. In the image reading portion 2, the light emitted from the light source 221 and reflected from the document sheet passes through the mirror 222, the mirror 23, the mirror 24, and the optical lens 25, and enters the CCD 26. This causes an analogue electric signal corresponding to an image of the document sheet to be output from the CCD 26. The analogue electric signal output from the CCD 26 is converted to a digital electric signal (image data) by an analogue front end circuit (not shown) and the digital electric signal is input to the control portion 5.

Meanwhile, in the image forming apparatus 10, a difference in density occurs between the image data read from the document sheet placed on the first contact glass 211 and the image data read from the document sheet conveyed by the ADF 1. Specifically, in the image forming apparatus 10, in a case where image data is read from the document sheet placed on the first contact glass 211, the document sheet is pressed against the first contact glass 211 by the ADF 1 to be in close contact with the first contact glass 211. On the other hand, in a case where image data is read from the document sheet conveyed by the ADF 1, the document sheet is conveyed in a state of being separated from the second contact glass 212 at the reading position P1. As a result, a difference in the distance from the contact glass to the document sheet is generated between the case where image data is read from the document sheet placed on the first contact glass 211, and the case where image data is read from the document sheet conveyed by the ADF 1. Due to the difference in the distance, the image data read from the document sheet conveyed by the ADF 1 is denser (darker) than the image data read from the document sheet placed on the first contact glass 211.

With regard to the above-described problem, there is known a conventional technology that can reduce the difference in image data density that occurs due to a difference between reading methods, by performing a shading correction using adjustment values that are obtained respectively for the reading methods in advance. Here, the shading correction is a process of removing density unevenness in the main scanning direction of image data that occurs due to a variation in the main scanning direction of the amount of light emitted from the light source 221, a variation in the main scanning direction of the light receiving sensitivity of the CCD 26, or the like. Specifically, according to the conventional technology, an adjustment value is obtained for each of a plurality of reading methods based on image data read from a predetermined reference density document sheet by each reading method.

Here, in the image forming apparatus 10, a part or all of the adjustment values may not be obtained. For example, in the image forming apparatus 10, a circuit board on which the control portion 5 including a storage portion 59 (see FIG. 2) storing the adjustment values for the reading methods, may fail and the circuit board may be replaced with another one. In that case, the user or the maintenance worker of the image forming apparatus 10 needs to do a work of causing the image forming apparatus 10 to, in correspondence with the implementation of each of a plurality of reading methods, read image data from the reference density document sheet, and obtain the adjustment value for each of the reading methods. Here, if the user or the like neglects the above-mentioned work, in the image forming apparatus 10, a part or all of the adjustment values corresponding to the reading methods are not obtained. In this case, the image forming apparatus 10 cannot reduce the difference in image data density that occurs due to a difference between reading methods.

On the other hand, in the image forming apparatus 10 according to the embodiment of the present disclosure, as described below, it is possible to reduce the difference in image data density that occurs due to a difference between reading methods.

Specifically, an adjustment value setting program is stored in the ROM of the control portion 5 in advance, wherein the adjustment value setting program causes the CPU to execute a first setting process (see the flowchart of FIG. 4), a second setting process (see the flowchart of FIG. 5), a first sheet reading process (see the flowchart of FIG. 6), and a second sheet reading process (see the flowchart of FIG. 7) that are described below. It is noted that the adjustment value setting program may be recorded on a computer-readable recording medium such as a CD, a DVD, or a flash memory, and may be installed from the recording medium to the EEPROM of the control portion 5 or the like.

As shown in FIG. 2, the control portion 5 includes a first reading processing portion 51, a first correction processing portion 52, a second reading processing portion 53, a second correction processing portion 54, a fourth setting processing portion 55, a first setting processing portion 56, a second setting processing portion 57, and a third setting processing portion 58. Specifically, the control portion 5 executes the adjustment value setting program stored in the ROM by using the CPU. This allows the control portion 5 to function as the first reading processing portion 51, the first correction processing portion 52, the second reading processing portion 53, the second correction processing portion 54, the fourth setting processing portion 55, the first setting processing portion 56, the second setting processing portion 57, and the third setting processing portion 58. Here, a device including the ADF 1, the image reading portion 2 and the control portion 5 is an example of the image reading apparatus of the present disclosure. It is noted that the present disclosure is applicable to image forming apparatuses and image reading devices such as a scanner device, a facsimile device, and a copier.

The first reading processing portion 51 executes a first fixed reading process in which to, by using the image reading portion 2, read image data (first reference data) from a reference sheet that is placed on the first contact glass 211 and includes a predetermined second reference image. For example, the first reading processing portion 51 executes the first fixed reading process by using the image reading portion 2 when a user operation instructing to execute the first setting process that is described below, is performed on the operation/display portion 6.

Here, the second reference image is the same image as the first reference image, which is a solid image having the reference density. It is noted that the second reference image may be different from the first reference image. For example, the second reference image may be composed of a plurality of elongated belt-like solid images respectively corresponding to a plurality of predetermined colors. Here, the second reference image is an example of the predetermined reference image of the present disclosure.

In addition, the first reading processing portion 51 executes a second fixed reading process in which to, by using the image reading portion 2, read image data from a sheet (normal document sheet) that is different from the reference sheet, placed on the first contact glass 211. For example, the first reading processing portion 51 executes the second fixed reading process by using the image reading portion 2 when a user operation instructing to execute the first sheet reading process that is described below, is performed on the operation/display portion 6. Here, the first fixed reading process and the second fixed reading process are an example of the first reading process of the present disclosure.

The first correction processing portion 52 performs a shading correction by using a predetermined first adjustment value on the image data read in the first fixed reading process and the second fixed reading process. Here, the first adjustment value is an adjustment value that corresponds to the first fixed reading process and the second fixed reading process. For example, in the image forming apparatus 10, the first adjustment value is stored in a predetermined first storage area of the storage portion 59 (see FIG. 2) provided in the control portion 5. For example, the storage portion 59 is the EEPROM. The first adjustment value is stored in the first storage area of the storage portion 59 by the first setting processing portion 56, the third setting processing portion 58, or the fourth setting processing portion 55.

Specifically, when the first fixed reading process has been executed in the first setting process that is described below, the first correction processing portion 52 performs the shading correction using the first adjustment value on the image data (first reference data) read from the reference sheet in the first fixed reading process. In addition, when the second fixed reading process has been executed in the first sheet reading process that is described below, the first correction processing portion 52 performs the shading correction using the first adjustment value on the image data read in the second fixed reading process from a sheet (normal document sheet) that is different from the reference sheet.

For example, the first correction processing portion 52 performs the shading correction for each pixel of the image data read in the first fixed reading process and the second fixed reading process, based on the following formula (1).

$$Dout = A \times B1 \times (Din - Dmin)/(Dmax - Dmin) \qquad (1)$$

It is noted that in the formula (1), Din denotes the density value of the image data before correction, and Dout denotes the density value of the image data after correction. In addition, in the formula (1), A denotes the gradation number of the image data after correction, and B1 denotes the first adjustment value. For example, the gradation number A is 256. In addition, in the formula (1), Dmax denotes the density value of the third reference data, and Dmin denotes the density value of the fourth reference data. Here, the fourth reference data is image data corresponding to an electric signal output from the CCD 26 when the light source 221 is off. For example, in the image forming apparatus 10, the control portion 5 obtains the third reference data and the fourth reference data when the image forming apparatus 10 has been powered on, or when the operation mode of the image forming apparatus 10 has changed from the sleep mode to the normal mode.

The second reading processing portion 53 executes a first conveyance reading process in which to, by using the image reading portion 2, read image data (second reference data) from a reference sheet that is conveyed by the ADF 1. For example, the second reading processing portion 53 executes the first conveyance reading process by using the ADF 1 and the image reading portion 2 when a user operation instructing to execute the second setting process that is described below, is performed on the operation/display portion 6.

In addition, the second reading processing portion 53 executes a second conveyance reading process in which to, by using the image reading portion 2, read image data from a sheet (normal document sheet) conveyed by the ADF 1 that is different from the reference sheet. For example, the second reading processing portion 53 executes the second conveyance reading process by using the ADF 1 and the image reading portion 2 when a user operation instructing to execute the second sheet reading process that is described below, is performed on the operation/display portion 6. Here, the first conveyance reading process and the second conveyance reading process are an example of the second reading process of the present disclosure.

The second correction processing portion 54 performs a shading correction by using a predetermined second adjustment value on the image data read in the first conveyance reading process and the second conveyance reading process. Here, the second adjustment value is an adjustment value that corresponds to the first conveyance reading process and the second conveyance reading process. For example, in the image forming apparatus 10, the second adjustment value is stored in a predetermined second storage area in the storage portion 59. The second adjustment value is stored in the second storage area of the storage portion 59 by the second setting processing portion 57, the third setting processing portion 58, or the fourth setting processing portion 55.

Specifically, when the first conveyance reading process has been executed in the second setting process that is described below, the second correction processing portion 54 performs the shading correction using the second adjustment value on the image data (second reference data) read from the reference sheet in the first conveyance reading process. In addition, when the second conveyance reading process has been executed in the second sheet reading process that is described below, the second correction processing portion 54 performs the shading correction using the second adjustment value on the image data read in the second conveyance reading process from a sheet (normal document sheet) that is different from the reference sheet.

For example, the second correction processing portion 54 performs the shading correction for each pixel of the image data read in the first conveyance reading process and the second conveyance reading process, based on the following formula (2). It is noted that in the formula (2), B2 denotes the second adjustment value.

$$Dout = A \times B2 \times (Din - Dmin)/(Dmax - Dmin) \qquad (2)$$

The fourth setting processing portion 55 sets the first adjustment value by using a predetermined first initial value in a case where the first reference data corresponding to the second reference image is read from the reference sheet in the first fixed reading process, and the first adjustment value is not stored in the storage portion 59. Here, the first initial value is used in obtainment of a first identification value by the first setting processing portion 56, which is described below. For example, the first initial value is lower than a third initial value that is described below. For example, the first initial value is obtained by multiplying the third initial value by 0.8.

For example, in the image forming apparatus 10, the first initial value is stored in the ROM in advance. The fourth setting processing portion 55 obtains the first initial value from the ROM in a case where the first reference data is read from the reference sheet in the first fixed reading process, and the first adjustment value is not stored in the first storage area of the storage portion 59. The fourth setting processing portion 55 then sets the first adjustment value by storing the obtained first initial value in the first storage area of the storage portion 59.

In addition, the fourth setting processing portion 55 sets the second adjustment value by using a predetermined second initial value in a case where the second reference data corresponding to the second reference image is read from the reference sheet in the first conveyance reading process, and the second adjustment value is not stored in the storage portion 59. Here, the second initial value is used in obtainment of a second identification value by the second setting processing portion 57, which is described below. For example, the second initial value is the same value as the first initial value. It is noted that the second initial value may be different from the first initial value.

For example, in the image forming apparatus 10, the second initial value is stored in the ROM in advance. The fourth setting processing portion 55 obtains the second initial value from the ROM in a case where the second reference data is read from the reference sheet in the first conveyance reading process, and the second adjustment value is not stored in the second storage area of the storage portion 59. The fourth setting processing portion 55 then sets the second adjustment value by storing the obtained second initial value in the second storage area of the storage portion 59.

The first setting processing portion 56, when the first reference data has been read from the reference sheet in the first fixed reading process, obtains a first identification value corresponding to the first reference data based on the first reference data, and sets the first adjustment value based on the first identification value.

For example, the first setting processing portion 56 obtains the first identification value based on the first reference data after the shading correction performed by the first correction processing portion 52. Here, in a case where the first reference data is read from the reference sheet in the first fixed reading process, and the first adjustment value is not stored in the storage portion 59, the first adjustment value is set by the fourth setting processing portion 55, and the shading correction is performed.

For example, the first setting processing portion 56 obtains the first identification value based on the following formula (3). It is noted that in the formula (3), Dout 1 denotes the density value of the first reference data after the shading correction performed by the first correction processing portion 52. In addition, in the formula (3), C1 denotes the first identification value. In addition, in the formula (3), E denotes the density value corresponding to the reference density of the reference sheet. For example, in the image forming apparatus 10, the density value corresponding to the reference density of the reference sheet is stored in the ROM in advance.

$$C1 = E/D\text{out}1 \quad (3)$$

The first setting processing portion 56 sets the first adjustment value by performing a calculation of multiplying the obtained first identification value by the first adjustment value stored in the storage portion 59, and replacing the first adjustment value stored in the storage portion 59 with the calculation result.

The second setting processing portion 57, when the second reference data has been read from the reference sheet in the first conveyance reading process, obtains a second identification value corresponding to the second reference data based on the second reference data, and sets the second adjustment value based on the second identification value.

For example, the second setting processing portion 57 obtains the second identification value based on the second reference data after the shading correction performed by the second correction processing portion 54. Here, in a case where the second reference data is read from the reference sheet in the first conveyance reading process, and the second adjustment value is not stored in the storage portion 59, the second adjustment value is set by the fourth setting processing portion 55, and the shading correction is performed.

For example, the second setting processing portion 57 obtains the second identification value based on the following formula (4). It is noted that in the formula (4), Dout2 denotes the density value of the second reference data after the shading correction performed by the second correction processing portion 54. In addition, in the formula (4), C2 denotes the second identification value. In addition, in the formula (4), E denotes the density value corresponding to the reference density of the reference sheet.

$$C2 = E/D\text{out}2 \quad (4)$$

The second setting processing portion 57 sets the second adjustment value by performing a calculation of multiplying the obtained second identification value by the second adjustment value stored in the storage portion 59, and replacing the second adjustment value stored in the storage portion 59 with the calculation result.

In a case where the second adjustment value has not been set by the second setting processing portion 57 and the first adjustment value has been set by the first setting processing portion 56, the third setting processing portion 58 sets the second adjustment value based on the first adjustment value. In addition, in a case where the first adjustment value has not been set by the first setting processing portion 56, and the second adjustment value has been set by the second setting processing portion 57, the third setting processing portion 58 sets the first adjustment value based on the second adjustment value.

For example, the third setting processing portion 58 determines whether or not the first adjustment value has been set by the first setting processing portion 56, based on whether or not the first setting process described below has been executed. In addition, the third setting processing portion 58 determines whether or not the second adjustment value has been set by the second setting processing portion 57, based on whether or not the second setting process described below has been executed.

For example, the third setting processing portion 58 sets the first adjustment value to a value that was obtained by subtracting a predetermined reference value from the second adjustment value. For example, the reference value is set in advance based on the separation distance at the reading position P1 between the second contact glass 212 and the document sheet conveyed by the ADF 1. For example, in the image forming apparatus 10, the reference value is stored in the ROM in advance. For example, the third setting processing portion 58 obtains the reference value from the ROM, obtains the second adjustment value from the second storage area of the storage portion 59, and subtracts the reference value from the second adjustment value. The third setting processing portion 58 then sets the first adjustment value by storing the subtraction result in the first storage area of the storage portion 59. It is noted that the third setting processing portion 58 may set the first adjustment value by using a value that was obtained by multiplying or dividing the second adjustment value by a predetermined value.

In addition, the third setting processing portion 58 sets the second adjustment value to a value that was obtained by adding the reference value to the first adjustment value. For example, the third setting processing portion 58 obtains the reference value from the ROM, obtains the first adjustment value from the first storage area of the storage portion 59, and adds the reference value to the first adjustment value. The third setting processing portion 58 then sets the second adjustment value by storing the addition result in the second storage area of the storage portion 59. It is noted that the third setting processing portion 58 may set the second adjustment value by using a value that was obtained by multiplying or dividing the first adjustment value by a predetermined value.

The third setting processing portion 58 sets the first adjustment value by using a predetermined third initial value in a case where image data is read in the second fixed reading process from a sheet (normal document sheet) that is different from the reference sheet, in a state where the first adjustment value has not been set by the first setting processing portion 56, and the second adjustment value has not been set by the second setting processing portion 57. For example, the third initial value is a value obtained by causing the first setting processing portions 56 of the control portions 5 of a plurality of image forming apparatuses 10 to set the first adjustment values respectively, and averaging out the set plurality of first adjustment values.

For example, in the image forming apparatus 10, the third initial value is stored in the ROM in advance. The third setting processing portion 58 sets the first adjustment value by obtaining the third initial value from the ROM, and storing the obtained third initial value in the first storage area of the storage portion 59.

The third setting processing portion 58 sets the second adjustment value by using a predetermined fourth initial value in a case where image data is read in the second conveyance reading process from a sheet (normal document sheet) that is different from the reference sheet, in a state where the first adjustment value has not been set by the first setting processing portion 56, and the second adjustment value has not been set by the second setting processing portion 57. For example, the fourth initial value is obtained by causing the second setting processing portions 57 of the control portions 5 of a plurality of image forming apparatuses 10 to set the second adjustment values respectively, and averaging out the set plurality of second adjustment values.

For example, in the image forming apparatus 10, the fourth initial value is stored in the ROM in advance. The third setting processing portion 58 sets the second adjustment value by obtaining the fourth initial value from the ROM, and storing the obtained fourth initial value in the second storage area of the storage portion 59.

[First Setting Process]

Figure 4:
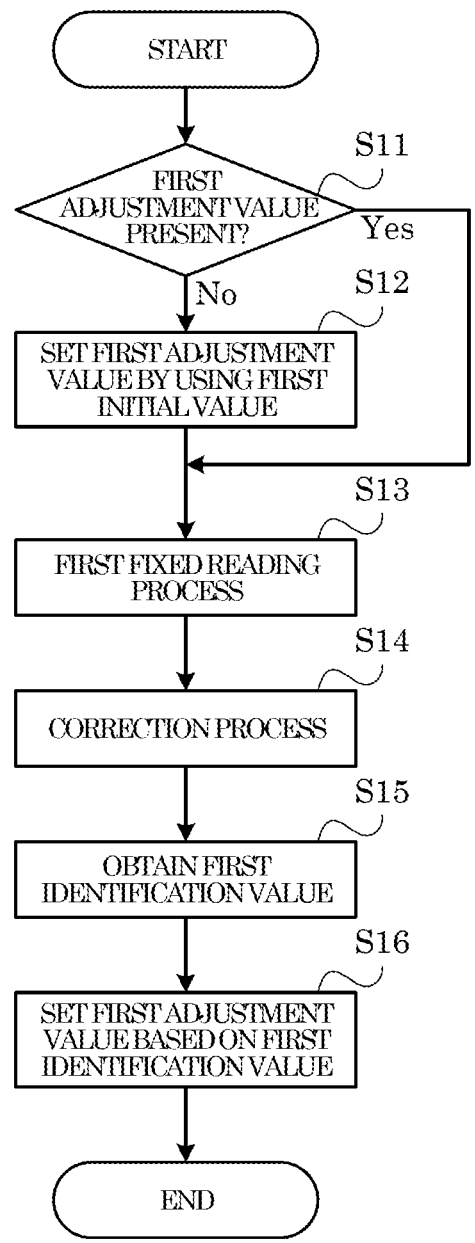
FIG. 4 is a flowchart showing an example of a first setting process executed by the image forming apparatus according to the embodiment of the present disclosure.

In the following, with reference to FIG. 4, a description is given of an example of the procedure of the first setting process executed by the control portion 5 in the image forming apparatus 10, and an example of the procedure of the adjustment value setting method of the present disclosure. Here, steps S11, S12, . . . represent numbers assigned to the processing procedures (steps) executed by the control portion 5. It is noted that the first setting process is executed in response to a user operation performed on the operation/display portion 6. For example, the user of the image forming apparatus 10 or the maintenance worker of the image forming apparatus 10 performs an operation on the operation/display portion 6 to instruct an execution of the first setting process in a state where the reference sheet is placed on the first contact glass 211. Upon receiving a user operation performed on the operation/display portion 6 to instruct an execution of the first setting process, the control portion 5 determines that the first reference data can be read from the reference sheet by the first fixed reading process, and executes the first setting process.

<Step S11>

First, in step S11, the control portion 5 determines whether or not the first adjustment value is stored in the first storage area of the storage portion 59.

Upon determining that the first adjustment value is stored in the first storage area of the storage portion 59 (Yes side at S11), the control portion 5 moves the process to step S13. On the other hand, upon determining that the first adjustment value is not stored in the first storage area of the storage portion 59 (No side at S11), the control portion 5 moves the process to step S12.

<Step S12>

In step S12, the control portion 5 sets the first adjustment value by using the first initial value. Here, the process of step S12 is executed by the fourth setting processing portion 55 of the control portion 5.

For example, the control portion 5 obtains the first initial value from the ROM. The control portion 5 then sets the first adjustment value by storing the obtained first initial value in the first storage area of the storage portion 59. With this configuration, it is possible to perform the shading correction even when data is not present in the first storage area of the storage portion 59. It is noted that the process of step S11 may be omitted, and the control portion 5 may always execute the process of step S12 when the first setting process is executed.

<Step S13>

In step S13, the control portion 5 executes the first fixed reading process. Here, the process of step S13 is an example of the first step of the present disclosure, and is executed by the first reading processing portion 51 of the control portion 5. With this step, the first reference data is read from the reference sheet placed on the first contact glass 211.

<Step S14>

In step S14, the control portion 5 executes the shading correction using the first adjustment value on the first reference data read in the first fixed reading process executed in step S13. Here, the process of step S14 is an example of the second step of the present disclosure, and is executed by the first correction processing portion 52 of the control portion 5.

<Step S15>

In step S15, the control portion 5 obtains the first identification value based on the first reference data after the shading correction performed in step S14.

<Step S16>

In step S16, the control portion 5 sets the first adjustment value based on the first identification value obtained in step S15. Here, the processes of steps S15 and S16 are an example of the third step of the present disclosure, and executed by the first setting processing portion 56 of the control portion 5.

For example, the control portion 5 sets the first adjustment value by performing a calculation of multiplying the obtained first identification value by the first adjustment value stored in the storage portion 59, and replacing the first adjustment value stored in the storage portion 59 with the calculation result. The control portion 5 then stores first execution information in a predetermined third storage area of the storage portion 59, and ends the first setting process, wherein the first execution information indicates that the first setting process has been executed.

[Second Setting Process]

Figure 5:
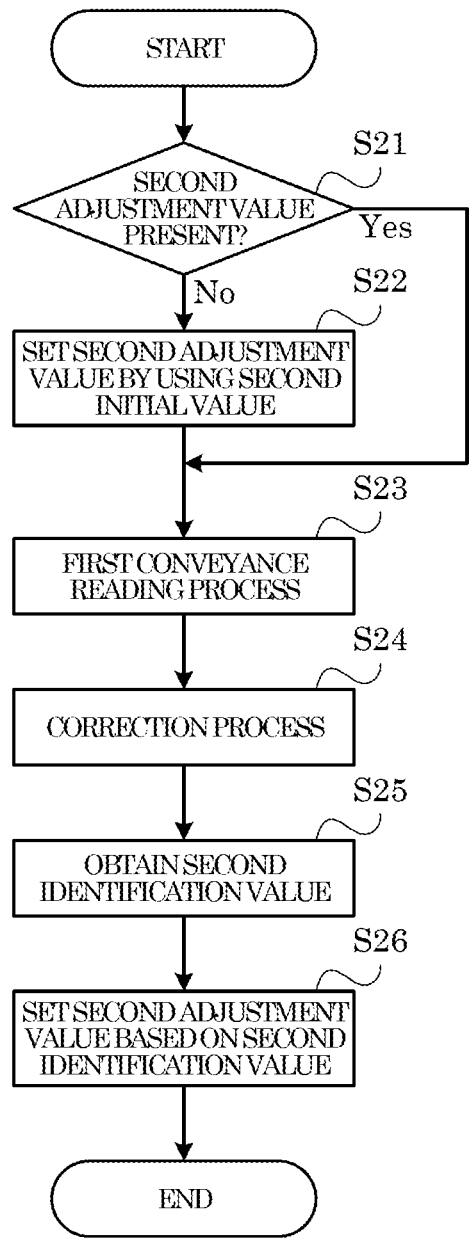
FIG. 5 is a flowchart showing an example of a second setting process executed by the image forming apparatus according to the embodiment of the present disclosure.

Next, with reference to FIG. 5, a description is given of an example of the procedure of the second setting process executed by the control portion 5 in the image forming apparatus 10, and an example of the procedure of the adjustment value setting method of the present disclosure. It is noted that the second setting process is executed in response to a user operation performed on the operation/display portion 6. For example, the user of the image forming apparatus 10 or the maintenance worker of the image forming apparatus 10 performs an operation on the operation/display portion 6 to instruct an execution of the second setting process in a state where the reference sheet is placed on the document sheet placement portion 11. Upon receiving a user operation performed on the operation/display portion 6 to instruct an execution of the second setting process, the control portion 5 determines that the second reference data can be read from the reference sheet by the first conveyance reading process, and executes the second setting process.

<Step S21>

First, in step S21, the control portion 5 determines whether or not the second adjustment value is stored in the second storage area of the storage portion 59.

Upon determining that the second adjustment value is stored in the second storage area of the storage portion 59 (Yes side at S21), the control portion 5 moves the process to step S23. On the other hand, upon determining that the second adjustment value is not stored in the second storage area of the storage portion 59 (No side at S21), the control portion 5 moves the process to step S22.

<Step S22>

In step S22, the control portion 5 sets the second adjustment value by using the second initial value. Here, the process of step S22 is executed by the fourth setting processing portion 55 of the control portion 5.

For example, the control portion 5 obtains the second initial value from the ROM. The control portion 5 then sets the second adjustment value by storing the obtained second initial value in the second storage area of the storage portion 59. With this configuration, it is possible to perform the shading correction even when data is not present in the second storage area of the storage portion 59. It is noted that the process of step S21 may be omitted, and the control portion 5 may always execute the process of step S22 when the second setting process is executed.

<Step S23>

In step S23, the control portion 5 executes the first conveyance reading process. Here, the process of step S23 is an example of the fourth step of the present disclosure, and is executed by the second reading processing portion 53 of the control portion 5. With this step, the second reference data is read from the reference sheet conveyed by the ADF 1.

<Step S24>

In step S24, the control portion 5 executes the shading correction using the second adjustment value on the second reference data read in the first conveyance reading process executed in step S23. Here, the process of step S24 is an example of the fifth step of the present disclosure, and is executed by the second correction processing portion 54 of the control portion 5.

<Step S25>

In step S25, the control portion 5 obtains the second identification value based on the second reference data after the shading correction performed in step S24.

<Step S26>

In step S26, the control portion 5 sets the second adjustment value based on the second identification value obtained in step S25. Here, the processes of steps S25 and S26 are an example of the sixth step of the present disclosure, and are executed by the second setting processing portion 57 of the control portion 5.

For example, the control portion 5 sets the second adjustment value by performing a calculation of multiplying the obtained second identification value by the second adjustment value stored in the storage portion 59, and replacing the second adjustment value stored in the storage portion 59 with the calculation result. The control portion 5 then stores second execution information in a predetermined fourth storage area of the storage portion 59, and ends the second setting process, wherein the second execution information indicates that the second setting process has been executed.

[First Sheet Reading Process]

Figure 6:
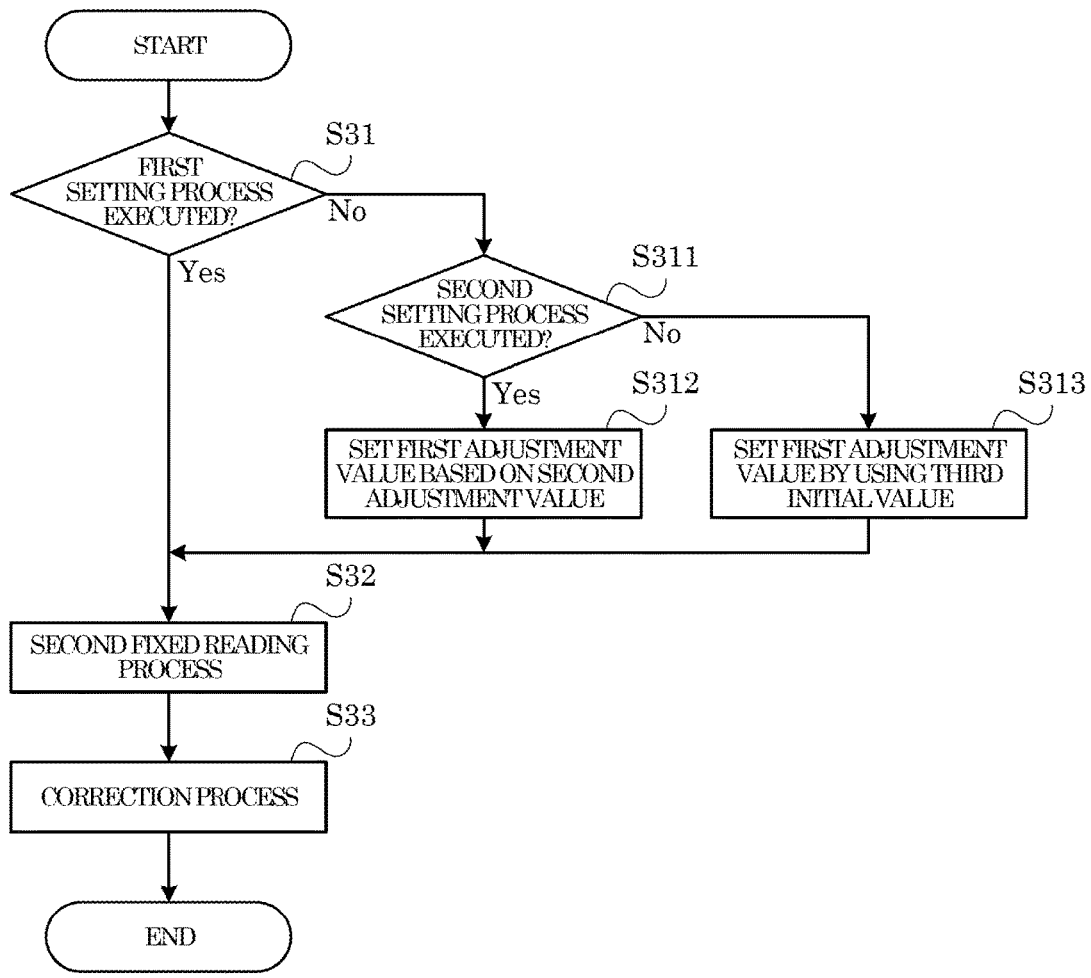
FIG. 6 is a flowchart showing an example of a first sheet reading process executed by the image forming apparatus according to the embodiment of the present disclosure.

In the following, with reference to FIG. 6, a description is given of an example of the procedure of the first sheet reading process executed by the control portion 5 in the image forming apparatus 10, and an example of the procedure of the adjustment value setting method of the present disclosure. It is noted that the first sheet reading process is executed in response to a user operation performed on the operation/display portion 6. For example, the user of the image forming apparatus 10 performs an operation on the operation/display portion 6 to instruct an execution of the first sheet reading process in a state where a sheet (normal document sheet) that is different from the reference sheet is placed on the first contact glass 211. Upon receiving a user operation performed on the operation/display portion 6 to instruct an execution of the first sheet reading process, the control portion 5 determines that image data can be read by the second fixed reading process from the sheet (normal document sheet) that is different from the reference sheet, and executes the first sheet reading process.

<Step S31>

First, in step S31, the control portion 5 determines whether or not the first setting process has been executed. For example, the control portion 5 determines that the first setting process has been executed when the first execution information is stored in the third storage area of the storage portion 59.

Upon determining that the first setting process has been executed (Yes side at S31), the control portion 5 moves the process to step S32. On the other hand, upon determining that the first setting process has not been executed (No side at S31), the control portion 5 moves the process to step S311.

<Step S311>

In step S311, the control portion 5 determines whether or not the second setting process has been executed. For example, the control portion 5 determines that the second setting process has been executed when the second execution information is stored in the fourth storage area of the storage portion 59.

Upon determining that the second setting process has been executed (Yes side at S311), the control portion 5 moves the process to step S312. On the other hand, upon determining that the second setting process has not been executed (No side at S311), the control portion 5 moves the process to step S313.

<Step S312>

In step S312, the control portion 5 sets the first adjustment value based on the second adjustment value. Here, the process of step S312 is an example of the seventh step of the present disclosure, and is executed by the third setting processing portion 58 of the control portion 5.

For example, the control portion 5 sets the first adjustment value to a value that was obtained by subtracting the reference value from the second adjustment value. For example, the control portion 5 obtains the reference value from the ROM, obtains the second adjustment value from the second storage area of the storage portion 59, and subtracts the reference value from the second adjustment value. The control portion 5 then sets the first adjustment value by storing the subtraction result in the first storage area of the storage portion 59. With this configuration, it is possible to reduce the difference in density between the image data read in the second fixed reading process and the image data read in the second conveyance reading process even in a case where the first setting process has not been executed and the first adjustment value has not been set. In addition, compared to a case where the third initial value is used to set the first adjustment value, it is possible to eliminate an influence, on the image data after the shading correction, of a variation in the reference density of the white reference plate 213 in each individual image forming apparatus 10, or a variation in the installation position of the white reference plate 213 in each individual image forming apparatus 10.

<Step S313>

In step S313, the control portion 5 sets the first adjustment value by using the third initial value. Here, the process of step S313 is executed by the first setting processing portion 56 of the control portion 5.

For example, the control portion 5 obtains the third initial value from the ROM. The control portion 5 then sets the first adjustment value by storing the obtained third initial value in the first storage area of the storage portion 59.

<Step S32>

In step S32, the control portion 5 executes the second fixed reading process. Here, the process of step S32 is an example of the first step of the present disclosure, and is executed by the first reading processing portion 51 of the control portion 5. In this step, image data is read from the sheet (normal document sheet) placed on the first contact glass 211 that is different from the reference sheet.

<Step S33>

In step S33, the control portion 5 performs the shading correction using the first adjustment value on the image data read from the document sheet in the second fixed reading process executed in step S32. Here, the process of step S33 is an example of the second step of the present disclosure, and is executed by the first correction processing portion 52 of the control portion 5. For example, in the image forming apparatus 10, the printing process is executed based on the image data after the shading correction performed in step S33.

[Second Sheet Reading Process]

Figure 7:
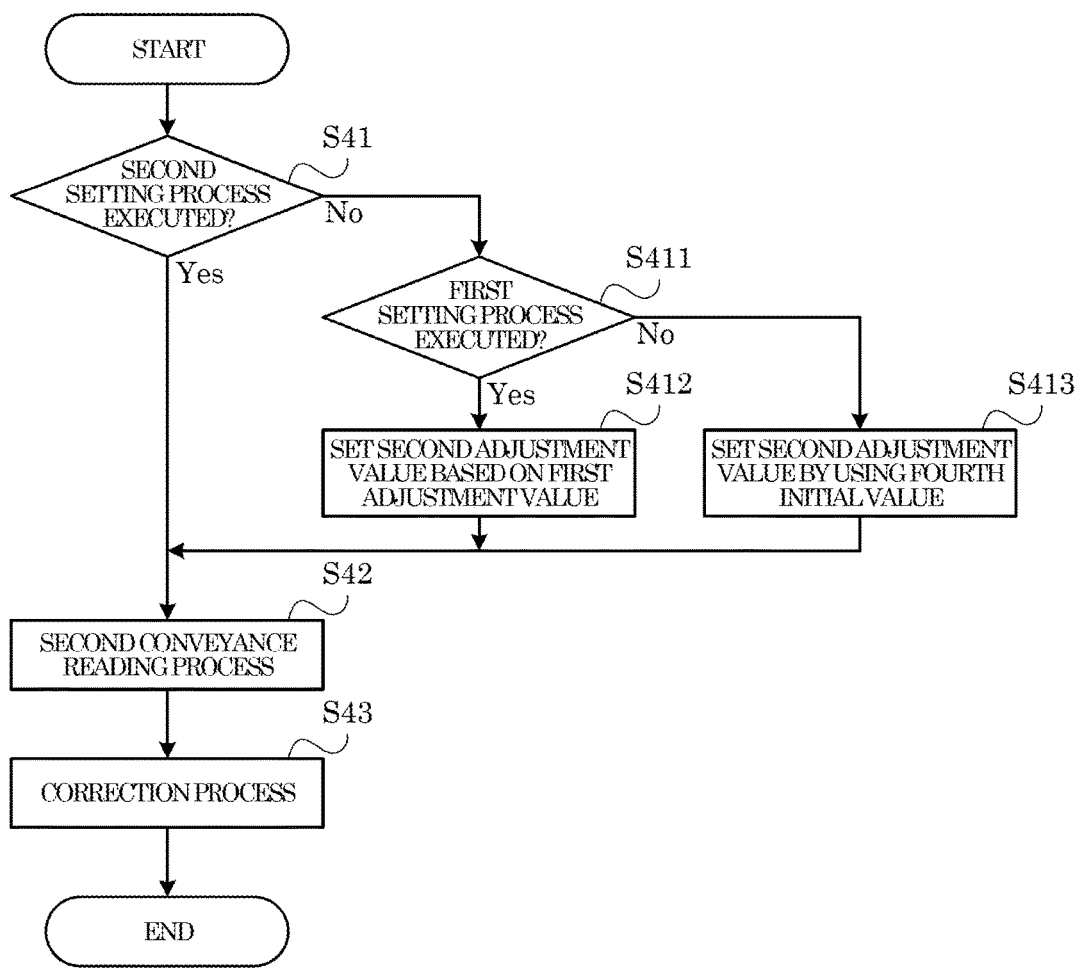
FIG. 7 is a flowchart showing an example of a second sheet reading process executed by the image forming apparatus according to the embodiment of the present disclosure.

In the following, with reference to FIG. 7, a description is given of an example of the procedure of the second sheet reading process executed by the control portion 5 in the image forming apparatus 10, and an example of the procedure of the adjustment value setting method of the present disclosure. It is noted that the second sheet reading process is executed in response to a user operation performed on the operation/display portion 6. For example, the user of the image forming apparatus 10 performs an operation on the operation/display portion 6 to instruct an execution of the second sheet reading process in a state where a sheet (normal document sheet) that is different from the reference sheet is placed on the document sheet placement portion 11. Upon receiving a user operation performed on the operation/display portion 6 to instruct an execution of the second sheet reading process, the control portion 5 determines that image data can be read by the second conveyance reading process from the sheet (normal document sheet) that is different from the reference sheet, and executes the second sheet reading process.

<Step S41>

First, in step S41, the control portion 5 determines whether or not the second setting process has been executed. For example, the control portion 5 determines that the second setting process has been executed when the second execution information is stored in the fourth storage area of the storage portion 59.

Upon determining that the second setting process has been executed (Yes side at S41), the control portion 5 moves the process to step S42. On the other hand, upon determining that the second setting process has not been executed (No side at S41), the control portion 5 moves the process to step S411.

<Step S411>

In step S411, the control portion 5 determines whether or not the first setting process has been executed. For example, the control portion 5 determines that the first setting process has been executed when the first execution information is stored in the third storage area of the storage portion 59.

Upon determining that the first setting process has been executed (Yes side at S411), the control portion 5 moves the process to step S412. On the other hand, upon determining that the first setting process has not been executed (No side at S411), the control portion 5 moves the process to step S413.

<Step S412>

In step S412, the control portion 5 sets the second adjustment value based on the first adjustment value. Here, the process of step S412 is an example of the seventh step of the present disclosure, and is executed by the third setting processing portion 58 of the control portion 5.

For example, the control portion 5 sets the second adjustment value to a value that was obtained by adding the reference value to the first adjustment value. For example, the control portion 5 obtains the reference value from the ROM, obtains the first adjustment value from the first storage area of the storage portion 59, and adds the reference value to the first adjustment value. The control portion 5 then sets the second adjustment value by storing the addition result in the second storage area of the storage portion 59. With this configuration, it is possible to reduce the difference in density between the image data read in the second fixed reading process and the image data read in the second conveyance reading process even in a case where the second setting process has not been executed and the second adjustment value has not been set. In addition, compared to a case where the fourth initial value is used to set the second adjustment value, it is possible to eliminate an influence, on the image data after the shading correction, of a variation in the reference density of the white reference plate 213 in each individual image forming apparatus 10, or a variation in the installation position of the white reference plate 213 in each individual image forming apparatus 10.

<Step S413>

In step S413, the control portion 5 sets the second adjustment value by using the fourth initial value. Here, the process of step S413 is executed by the second setting processing portion 57 of the control portion 5.

For example, the control portion 5 obtains the fourth initial value from the ROM. The control portion 5 then sets the second adjustment value by storing the obtained fourth initial value in the second storage area of the storage portion 59.

<Step S42>

In step S42, the control portion 5 executes the second conveyance reading process. Here, the process of step S42 is an example of the fourth step of the present disclosure, and is executed by the second reading processing portion 53 of the control portion 5. In this step, image data is read from the sheet (normal document sheet) conveyed by the ADF 1 that is different from the reference sheet.

<Step S43>

In step S43, the control portion 5 performs the shading correction using the second adjustment value on the image data read from the document sheet in the second conveyance reading process that was executed in step S42. Here, the process of step S43 is an example of the fifth step of the present disclosure, and is executed by the second correction processing portion 54 of the control portion 5. For example, in the image forming apparatus 10, the printing process is executed based on the image data after the shading correction that was performed in step S43.

As described above, in the image forming apparatus 10, when one of the first adjustment value and the second adjustment value has not been set based on the image data read from the reference sheet, that adjustment value is set based on the other of the first adjustment value and the second adjustment value. This makes it possible to reduce the difference in image data density that occurs due to a difference between reading methods.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
a processor;
an image reading portion configured to read image data from a sheet;
a storage medium configured to store a predetermined first adjustment value and a predetermined second adjustment value;
a sheet placement portion on which the sheet is placed; and
a sheet conveying portion configured to convey the sheet, wherein the processor is configured to execute one or more control programs to provide:
a first reading processing portion configured to execute a first reading process in which to, by using the image reading portion, read image data from the sheet placed on the sheet placement portion;
a first correction processing portion configured to execute a shading correction using the first adjustment value, on the image data read in the first reading process;
a first setting processing portion configured to, when first reference data corresponding to a predetermined reference image has been read in the first reading process from a reference sheet including the reference image, obtain a first identification value corresponding to the first reference data, based on the first reference data, and set the first adjustment value based on the first identification value;
a second reading processing portion configured to execute a second reading process in which to, by using the image reading portion, read image data from the sheet conveyed by the sheet conveying portion;
a second correction processing portion configured to execute the shading correction using the second adjustment value, on the image data read in the second reading process;
a second setting processing portion configured to, when second reference data corresponding to the reference image has been read from the reference sheet in the second reading process, obtain a second identification value corresponding to the second reference data, based on the second reference data, and set the second adjustment value based on the second identification value; and
a third setting processing portion configured to set the second adjustment value based on the first adjustment value in a case where the second adjustment value has not been set by the second setting processing portion and the first adjustment value has been set by the first setting processing portion, and set the first adjustment value based on the second adjustment value in a case where the first adjustment value has not been set by the first setting processing portion and the second adjustment value has been set by the second setting processing portion.

2. The image reading device according to claim 1, wherein the processor is further configured to execute the one or more control programs to provide:
a fourth setting processing portion configured to set the first adjustment value by using a predetermined first initial value in a case where the first reference data is read from the reference sheet in the first reading process, and the first adjustment value is not stored in the storage medium, and set the second adjustment value by using a predetermined second initial value in a case where the second reference data is read from the reference sheet in the second reading process, and the second adjustment value is not stored in the storage medium, wherein
the first setting processing portion obtains the first identification value based on the first reference data after the shading correction performed by the first correction processing portion, and
the second setting processing portion obtains the second identification value based on the second reference data after the shading correction performed by the second correction processing portion.

3. The image forming apparatus according to claim 1, wherein
the third setting processing portion sets the second adjustment value to a value that was obtained by adding a predetermined reference value to the first adjustment value, and sets the first adjustment value to a value that was obtained by subtracting the reference value from the second adjustment value.

4. The image forming apparatus according to claim 1, wherein
the third setting processing portion sets the first adjustment value by using a predetermined third initial value in a case where the image data is read in the first reading process from a sheet that is different from the reference sheet, in a state where the first adjustment value has not been set by the first setting processing portion, and the second adjustment value has not been set by the second setting processing portion, and sets the second adjustment value by using a predetermined fourth initial value in a case where image data is read in the second conveyance reading process from a sheet that is different from the reference sheet, in a state where the first adjustment value has not been set by the first setting processing portion, and the second adjustment value has not been set by the second setting processing portion.

5. An image forming apparatus comprising:
the image reading device according to claim 1; and
an image forming portion configured to form an image based on image data read by the image reading device.

6. An adjustment value setting method implemented in an image reading device including a processor, an image reading portion configured to read image data from a sheet, a storage medium configured to store a predetermined first adjustment value and a predetermined second adjustment value, a sheet placement portion on which the sheet is placed, and a sheet conveying portion configured to convey the sheet, the processor configured to perform:
a first step of executing a first reading process in which image data is read, by using the image reading portion, from the sheet placed on the sheet placement portion;
a second step of executing a shading correction using the first adjustment value, on the image data read in the first reading process;
a third step of, when first reference data corresponding to a predetermined reference image has been read in the first reading process from a reference sheet including the reference image, obtaining a first identification value corresponding to the first reference data, based on the first reference data, and setting the first adjustment value based on the first identification value;

a fourth step of executing a second reading process in which image data is read, by using the image reading portion, from the sheet conveyed by the sheet conveying portion;

a fifth step of executing the shading correction using the second adjustment value, on the image data read in the second reading process;

a sixth step of, when second reference data corresponding to the reference image has been read from the reference sheet in the second reading process, obtaining a second identification value corresponding to the second reference data, based on the second reference data, and setting the second adjustment value based on the second identification value; and a seventh step of setting the second adjustment value based on the first adjustment value in a case where the second adjustment value has not been set in the sixth step and the first adjustment value has been set in the third step, and setting the first adjustment value based on the second adjustment value in a case where the first adjustment value has not been set in the third step and the second adjustment value has been set in the sixth step.

* * * * *